United States Patent [19]

Seligman

[11] 4,059,224
[45] Nov. 22, 1977

[54] CODE RECOGNITION RECORD MEDIUM AND TECHNIQUE

[75] Inventor: Lawrence Seligman, Shirley, Mass.

[73] Assignee: Data General Corporation, Westboro, Mass.

[21] Appl. No.: 687,738

[22] Filed: May 19, 1976

Related U.S. Application Data

[62] Division of Ser. No. 421,884, Dec. 5, 1973, Pat. No. 3,979,577.

[51] Int. Cl.² .......................... G06K 7/14; G06K 9/10; G06K 19/06
[52] U.S. Cl. ............................ 235/462; 340/146.3 D; 235/466; 235/494
[58] Field of Search ................... 235/61.7 B, 61.11 E, 235/61.11 D, 61.12 N; 360/4, 40; 340/146.3 K, 146.3 Z, 146.3 D, 146.3 AG; 250/568

[56] References Cited

U.S. PATENT DOCUMENTS

| | | | |
|---|---|---|---|
| 3,636,317 | 1/1972 | Torrey | 235/61.12 N |
| 3,723,710 | 3/1973 | Crouse | 235/61.11 E |
| 3,784,792 | 1/1974 | Dobras | 235/61.11 E |
| 3,811,033 | 5/1974 | Herrin | 235/61.11 E |
| 3,868,634 | 2/1975 | Dolch | 340/146.3 D |

Primary Examiner—Robert M. Kilgore
Attorney, Agent, or Firm—Joel Wall; Jacob Frank

[57] ABSTRACT

A method of reading on a record medium a two level code representing at least one character of a set of characters, each character having six consecutive transitional occurrences between the two levels of the code comprising: scanning the record medium to derive a time based electrical signal representative of said transitional occurrences; measuring four periods between alternate ones of said transitional occurrences; comparing each two overlapping periods to generate three ratios, each ratio representing not more than one of three possible values of nearly one, smaller than one and larger than one, and; decoding the values arrived at for said three ratios to define a character. The arrangement of the coded indicia on the record medium or the font of type for imprinting the same is such that, for each character, not more than two bits of the same level are arranged consecutively and two consecutive bits of a first level are not immediately followed by two consecutive bits of a second level.

2 Claims, 8 Drawing Figures

CODE RECOGNITION RECORD MEDIUM AND TECHNIQUE

CROSS REFERENCE TO RELATED APPLICATIONS

This is a division, of application Ser. No. 421,884 filed Dec. 5, 1973, now U.S. Pat. No. 3,979,577.

Filed simultaneously with this application is a patent application assigned to the same assignee as this application, entitled Code Recognition Apparatus by Herbert George Coles, Jr, now U.S. Patent No. 3,891,831.

BACKGROUND OF THE INVENTION

The present invention relates to an automated code recognition system including the coded label, a type of font for providing the coded label and the method of analyzing the code, and in particular, with respect to a binary or two level code employing, for example, background and appropriate indicia. Binary codes of this type may be used for personal or merchandise identification through optical and/or magnetic techniques.

Semi-automated and fully automated sensing systems for code recognition purposes are quickly becoming a more attractive consideration for point-of-sale operations, such as a check-out counter application in retail stores and supermarkets. They provide quick and accurate data access for such items as: merchandise identification; merchandise price, and; credit identification.

It has been found that it would be desirable for such systems to be versatile to accomodate small as well as large operations and thus to lend themselves to handheld operator actuated scanners, in addition to the larger and more sophisticated fixed scanner stations, by which merchandise is normally transported. In addition, the system should be flexible to also accommodate the reading of coded labels generated with hand-operated printing devices that may be used at retail outlets, as opposed to printed labels that are derived from sophisticated printing machines normally having minimal tolerances in print variations. Even the latter occasionally generate irregularities caused by problems incurred in each, the plate making and printing process.

It should be readily evident, however, that the use of hand-operated instruments introduces problems which can affect the overall efficiency of such systems. For example, a hand-operated scanner in being moved over a coded label would be subject to speed variations, acceleration variations, and/or angular velocity components in directions normal to the code transverse direction. The hand-operated printing mechanism, on the other hand, would introduce variations in print that might play havoc with the print tolerances for which such a system is specified. These variations in print tolerance might also occur as a consequence of the wide variety of coded media to which such a system should lend itself. Such coded media might include credit cards, labels, tickets, packages, etc.

SUMMARY OF THE INVENTION

It is therefore an object of the present invention to provide a simple binary encoding scheme that is readable by various scanning technologies and is inherently tolerant of the most common distortions encountered in both the scanning and printing processes.

Another object of the present invention is to provide an inexpensive and efficient system for analyzing binary coded information that will accomodate the type of variations in speed that would be incurred in employing a hand-operated scanner.

A further object of the present invention is to provide an inexpensive and efficient system for analyzing binary coded information that will accomodate the type of variations in print that would be incurred in employing a hand-operated printing device.

Yet another object of the present invention is to provide a binary encoding scheme that is amenable to omni-directional scanning.

Still a further object of the present invention is to provide a coding scheme that is additionally scale independent.

An additional object of the present invention is to provide a binary encoding scheme that is intercharacter gap dependent.

In accordance with one preferred embodiment of the present invention, there is shown a code reading system for reading a binary or two level code by sensing the white to black (W-B) and black to white (B-W) transitions and separately measuring the periods between successive W-B transitions and between successive B-W transitions. As the measurements of two overlappng periods are derived, one of a series of comparisons of the periods of overlapping W-B and B-W intervals is effected to generate, in ratio form, intelligence comprising several of such comparisons which are decoded to identify the binary code. Because comparisons are computed over two overlapping time periods, each one defined by alternate transitions, the large accelerations observed with handoperated scanners and considerable point variations can be tolerated. This is further enhanced by the simple choice of the criteria employed which are: nearly one, smaller than one, and; greater than one.

The use of these three simple criteria is to some degree based upon the code configuration to be scanned. By a proper configuration, the criteria are easily arrived at. In the preferred embodiment, the arrangement of the two level code, each character in a set of characters, comprises of three bars of varying widths and spacings where each width and spacing is a multiple of a basic module. No bar or space comprises of more than two modules and no two modules of a first level is followed by two modules of the second level.

Further, because of the comparison made between overlapping periods defined by two sets of alternate transitions, less criticality is placed on tight print tolerance to afford the use of less expensive hand-operated devices to accomodate substantially less than perfect imprints. This lies in the fact that the overlapping periods will have been equally increased by the locality, resulting into spread print variations to generally maintain a similar ratio.

DESCRIPTION OF THE PREFERRED EMBODIMENT

Figure 1:
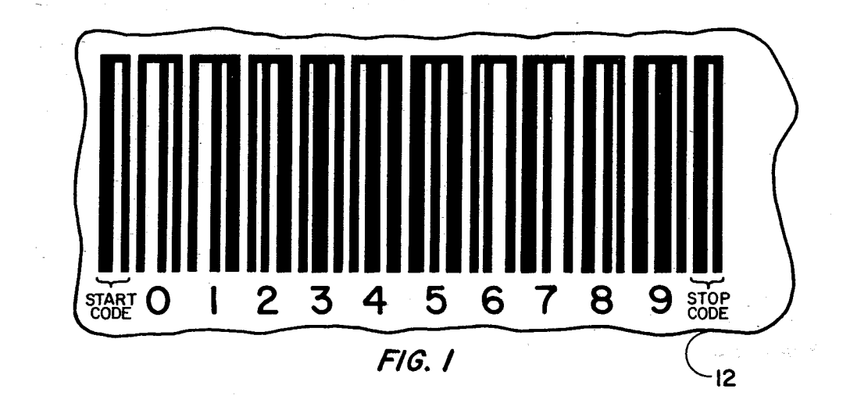
FIG. 1 is an enlarged view of a record medium carrying the three bar code or representing a font of type used in the present invention.

With reference to the drawings, there is shown in FIG. 1 a three bar code positioned on a record medium 12 for the digits zero through nine. Also shown, is a two bar coded character for start/stop commands. As illustrated, no bar is wider than two modules or bits, and no space between two bars in a character code is wider than two modules. it is also noted, that in each encoded character, no two consecutive modules of a first level (e.g. black) are followed by two consecutive modules of a second level (e.g. white). It should also be understood that three bar coded depicted could comprise a font of type from which the code is printed. A start/stop symbol represented by two bars is also shown.

Figure 2:
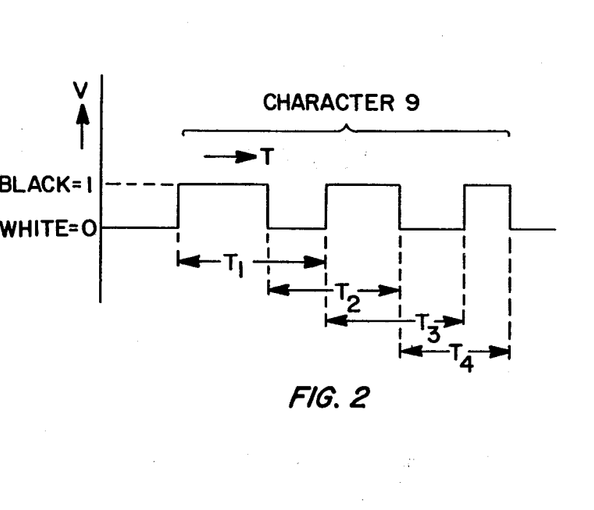
FIG. 2 is a waveform diagram representing a character nine to show the W-B and B-W transitions and the defined periods $T_1$ through $T_4$.

In the waveform diagram depicted in FIG. 2, which represents a scanned character nine, the three bars are represented by the black levels detected by a scanner and the two spaces in between are represented by the white levels. This configuration in binary form can be represented by 1101101. Four measurements are defined and performed during a scan operation on a character which are based upon the W–B and B–W transitions detected. These comprise deriving the periods: $T_1$ extending from the first to second leading edges or W-B transitions; $T_2$ from the first to second trailing edges or B-W transitions; $T_3$ from the second to third leading edges or W-B transitions, and; $T_4$ from the second to third trailing edges or B-W transitions.

In the decoding operation, the ratio of two successive but overlapping periods are used to derive three ratios i.e. $R_{21} = T_2/T_1$; $R_{32} = T_3/T_2$, and; $R_{4/3} = T_4/T_3$. It should be understood, of course, that the inverse of these ratios could be selected as criteria, if desired. With the particular three bar code depicted in FIG. 1, these ratios can readily take one of three values: nearly one (N); smaller than one (S), and; larger than one (L). A chart is shown below where for each character of the set shown in FIG. 1, there is shown: a corresponding code pattern in ones and zeros in a second column; period values derived in a third column (a time unit one being equal to each module unit transversed), and; value criteria for each of the three ratios for each character in a fourth column.

| Character | Code Pattern | $T_1$ | $T_2$ | $T_3$ | $T_4$ | $R_{21}$ | $R_{32}$ | $R_{43}$ |
|---|---|---|---|---|---|---|---|---|
| 0 | 100101 | 3 | 3 | 2 | 2 | N | S | N |
| 1 | 1001011 | 3 | 3 | 2 | 3 | N | S | L |
| 2 | 101011 | 2 | 2 | 2 | 3 | N | N | L |
| 3 | 101101 | 2 | 3 | 3 | 2 | N | N | S |
| 4 | 1011011 | 2 | 3 | 3 | 3 | L | N | N |
| 5 | 1101011 | 3 | 2 | 2 | 3 | S | N | L |
| 6 | 101001 | 2 | 2 | 3 | 3 | N | L | N |
| 7 | 1101001 | 3 | 2 | 3 | 3 | S | L | N |
| 8 | 110101 | 3 | 2 | 2 | 2 | S | N | N |

-continued

| Character | Code Pattern | $T_1$ | $T_2$ | $T_3$ | $T_4$ | $R_{21}$ | $R_{32}$ | $R_{43}$ |
|---|---|---|---|---|---|---|---|---|
| 9 | 1101101 | 3 | 3 | 3 | 2 | N | N | S |

Figure 3:
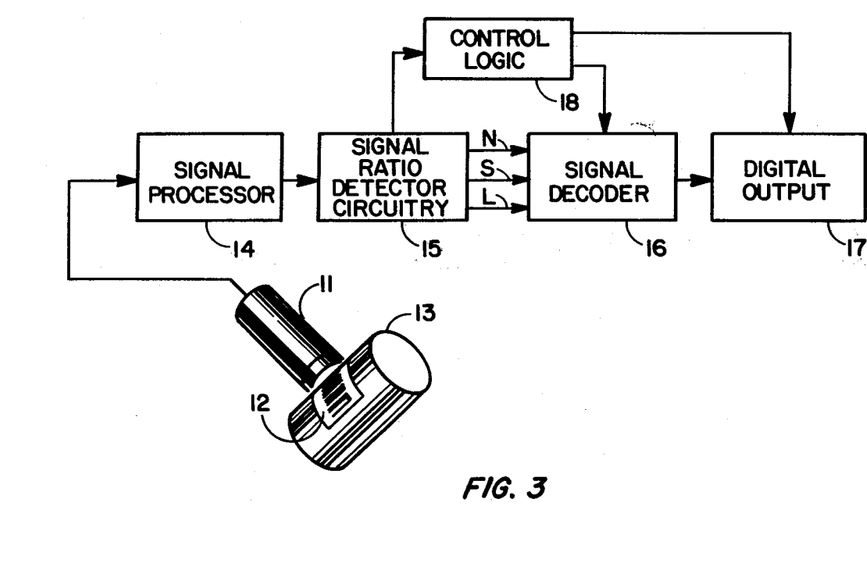
FIG. 3 is a block diagram illustrating a general overview of the code reading system of the present invention.

With reference to FIG. 3, there is shown a block diagram generally describing the code recognition system of the present invention being used with a hand-operated scanner device 11 for analyzing a coded record 12. The coded record contains a selected combination of coded characters, from the code depicted in FIG. 1, for identifying the merchandise 13 to which the record is affixed. Such a scanner 11 for discerning a two level (black/white) code, are well known in the art and need not be described. It should be noted, however, that a scanner sensitive to a two level magnetic code could also be adapted for use with the present invention.

The black and white two level signal, in the present embodiment, is translated into a two level electrical signal in the scanner 11 by a suitable photodetector (not shown) and then fed to a signal processor 14 where electrical signals indicative of transitions between the two levels are generated. The output of signal processor 14 is then operated on by signal ratio detector circuitry 15 for measuring the periods $T_1$ through $T_4$, then applying a series of ratio tests and then deriving for each such tests, one of three values in terms of: nearly one (N); smaller than one (S), or; larger than one (L). The latter values for each test are routed to a signal decoder 16 and upon values detected for each of three successive tests, the decoded signal is fed to a digital output 17 where the digit is displayed or stored. A control circuit 18, connected from the ratio detector circuitry 15, controls the operation of signal decoder 16 and digital output unit 17.

Figure 4:
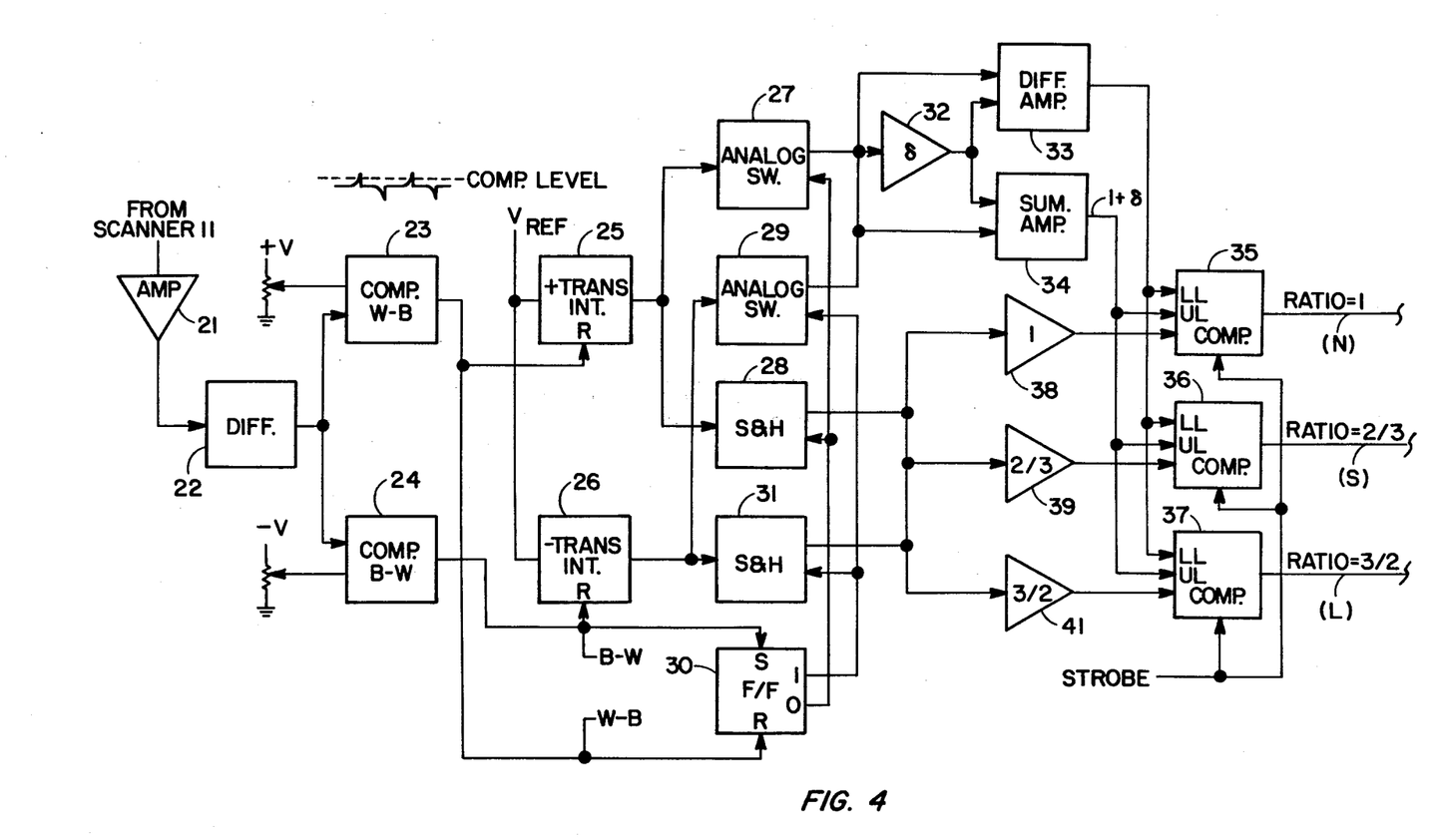
FIG. 4 is a diagram, in block form, of the circuitry used for the scanner processor 14 and signal ratio detector 15 shown in FIG. 3.

In turning to FIG. 4, the signal processor is shown to include an amplifier 21 connected from the scanner 11 and the output of which is differentiated by a differentiator 22 to generate bipolar signals denoting the times of occurrence of the white to black and black to white transitions. These bipolar differentiated signals are fed to comparators 23 and 24 for comparison with threshold values $+V$ and $-V$ respectively, to generate two sets of uniform pulses. By using such an arrangement, the scanning system is made independent of absolute reflectivities of black and white so long as a suitable contrast of the different colored bars is maintained. Accordingly, it is readily evident that color combinations other than black and white may be used.

A first set of positive pulses is emitted from comparator 23, denoting white to black (W–B) transitions, and a second set of positive pulses is emitted from comparator 24, denoting black to white (B–W) transitions.

Transition integrators 25 and 26 are connected to a common fixed reference voltage V REF. These integrators 25, 26, generate a constant slope ramp and are respectively reset by the trailing edge of signals W–B and B–W. The outputs of integrator 25 are fed to a suitable analog switch 27 and a conventional sample and hold unit 28 and the output of integrator 26 is fed to a similar analog switch 29 and similar sample and hold unit 31. Analog switch 27 and sample and hold unit 28 are triggered by the leading edge of the W–B signal to respectively turn off analog switch 27 and hold in sample and hold unit 28, the voltage representation of the integrated time value received from integrator 25. Similarly, the leading edge of the B–W signal pulse turns off analog switch 29 and holds in sample and hold unit 31, the voltage representation of the integrated time value 29 received from integrator 26. By reason of the NAND gate Flip-Flop 30, it will be clear that when one switching unit is off, the other is on. Similarly, when one sample and hold unit is in a sample condition, the other will be in a hold condition.

The analog switches 27 and 29 are connected in common to three amplifiers including, a first amplifier 32 having a predetermined gain delta ($\delta$), a difference amplifier 33 and a summing amplifier 34. The output of amplifier 32 is also fed to each, the difference amplifier 33 and summing amplifier 34, so that these amplifiers will respectively provide gain values of one minus delta $(1 - \delta)$ and one plus delta $(1 + \delta)$, assuming the gain characteristic of each of the amplifiers is one. Thus, whichever of the analog switches 27, 29 is open to pass a signal from one of the integrators, the signal passed is acted upon by the difference and summing amplifiers to generate two output signals, each respectively decreased or increased by a value $\delta$. Together these signals represent an output having a tolerance of $1 \pm \delta$.

Figure 5:
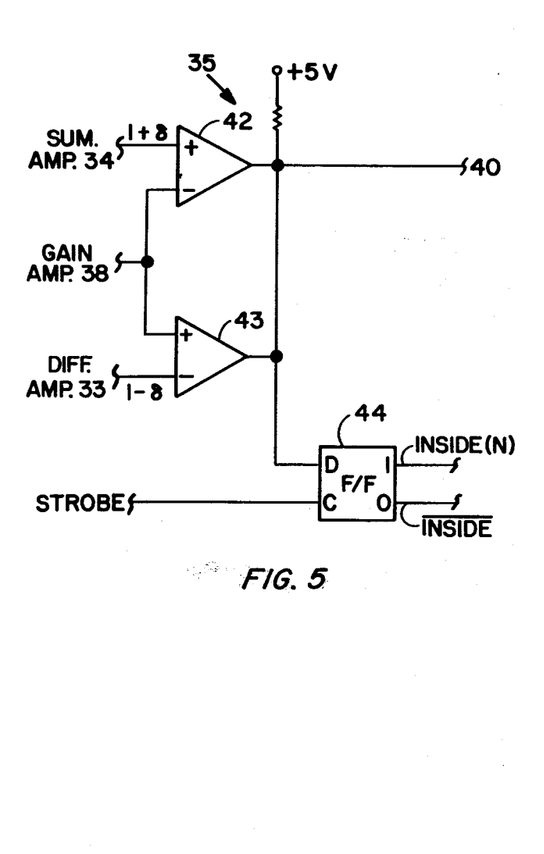
FIG. 5 is a diagram, generally in block form, of the circuitry used for the comparators 35, 36 and 37 in FIG. 4.

The lower level signal from the difference amplifier 33 is applied to the LL input of each of three comparators 35, 36 and 37. Similarly, the upper level output of summing amplifier 34 is applied to the UL input of each of the three comparator units 35, 36 and 37. A third input to each of the comparators 35, 36 and 37 is connected from the sample and hold units 28 and 31. Three different lead paths are used for this latter connection and in each is included a gain amplifier of predetermined value based upon the particular code configuration. With the configuration depicted in FIG. 1, values corresponding to one, two thirds, and three-halves are employed to assist in determining which values each of the three ratios has, for eventually decoding the binary coded information. Amplifier 38, having a gain factor of one, is connected to comparator 35. Amplifier 39, having a gain of twothirds, is connected to comparator 36. Amplifier 41, having a gain of three-halves, is connected to comparator 37. A typical example of a comparator unit 35 through 37 will be described with reference to FIG. 5, wherein comparator 35 is shown to comprise a pair of analog comparators 42 and 43 connected in common to the data input of flip-flop 44. In operation, when the summing amplifier 34 output to the positive input of amplifier 42 is more positive than the amplifier 38 output, then a plus 5V output will be effected. Similarly, when the amplifier 38 output to the positive input of amplifier 43 is more positive than the difference amplifier 33 output to the minus output of amplifier 43, then a plus 5V output will be effected. When both amplifiers exhibit a plus 5V output, they effectively act like an AND gate to enable flip-flop 44 to generate an INSIDE signal denoting a nearly one (N) ratio. Conversely, when amplifier 38 output is not within the bounds created by the output of amplifiers 33 and 34, i.e. amplifier 38 output is more positive than amplifier 34 $(1 + \delta)$, or more negative than amplifier 33 $(1 - \delta)$, the level at flip-flop 44 D input will be zero volts, enabling a negative response ($\overline{\text{INSIDE}}$) from flip-flop 44.

With reference back to FIG. 4, an immediately previous period T held in one of the sample and hold units 28, 31, is operated on by each of the amplifiers 38, 39 and 41 to respectively modify the held signal with each of the three multiplication factors shown. The modified signal will only cause one of the comparators 35, 36 and 37 to indicate that the modified signal is nearly the same as that from one of the analog units 27 and 29, and an output will only be generated from that comparator. If the held information is equal to one, then only the signal path including amplifier 38 will be within the bounds determined by amplifiers 33 and 34. This will enable comparator 35 to produce an inside output denoting the detected ratio as nearly one. On the other hand, if the information from one of the sample and hold units is less than one, amplifier 39 will operate on the signal so that it will lie between the LL and UL levels of comparator 36, to enable comparator 36, denoting the detected ratio is less than 1. If the information from one of the sample and hold units is greater than 1, the signal will be operated on by the amplifier 41 so that the resulting signal will lie between the LL and UL levels of comparator 37, to enable comparator 37, denoting the detected ratio is greater than 1.

As will be apparent, the ratio formed by the signal at either of analog switches 27, 29 with the immediately previous signal from either of sample and hold units 28, 31 to be detected will only cause a value of nearly one, greater than one or less than one. This, in effect, only allows one of the comparators 35, 36 or 37 to be enabled with each ratio determination. As will be discussed in greater detail hereinafter, a strobe signal occurring at the time of the two level transitions four through six are used to sample all the comparators at each of three times to generate the values detected for $R_{21}$, $R_{32}$, and $R_{43}$.

Figure 6:
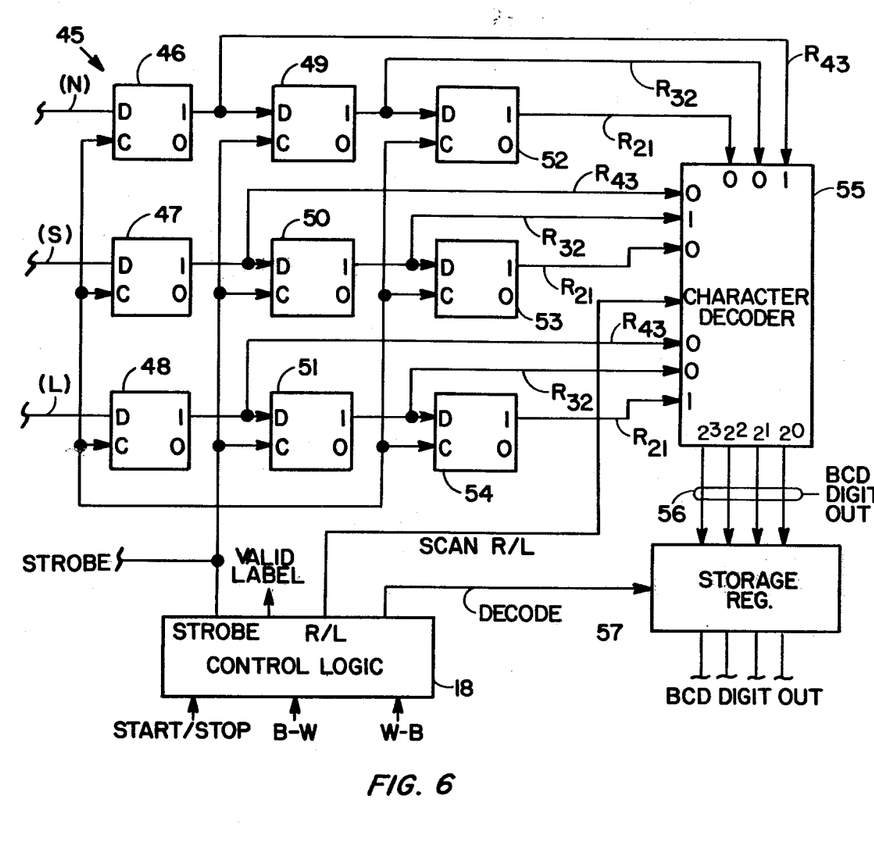
FIG. 6 is a diagram, in block form, of the circuitry used for the signal decoder 16 shown in FIG. 3.

The signals from the comparators 35, 36 and 37 are then fed to the signal decoder 16 which is described in detail in FIG. 6, where there is generally shown a shift register 45, a character decoder 55 and storage register 57. The shift register 45 comprises a series of memory units 46 through 54 with three vertical columns of three units, each whereby the three units 46, 47 and 48 of the first column are positioned in parallel to respectively receive and store the values from the output of comparators 35, 36 and 37 representing the decision made as to one of the three ratio tests $R_{21}$, $R_{32}$ and $R_{43}$. For example, if the ratio test $R_{21}$ indicated a nearly one decision, then memory units 46 would be enabled by comparator 35 to denote the nearly one (N) output, whereas memory units 43 and 44 would maintain their zero outputs.

Immediately prior to a decision made on the second ratio tests $R_{32}$, the information on memory units 46, 47 and 48 is respectively shifted to memory units 49, 50 and 51. In a similar manner, after a decision has been made as to the ratio test $R_{32}$ and immediately previous to making the ratio test $R_{43}$, information from memory units 49, 50 and 51 is respectively shifted in parallel to memory units 52, 53 and 54, whereas the information in memory units 46, 47 and 48 is similarly shifted to memory units 49, 50 and 51. Thus at the end of the three ratio tests per character, shift register 45 provides an indication of each of these three ratio test decisions.

As is shown, the character decoder 55 is connected to the shift register 45 so that the outputs of memory units 46, 49 and 52, which are coupled from the nearly one (N) comparator 35, are connected to a first input of character decoder 55. Similarly, the outputs of memory units 47, 50 and 53, which are coupled from the smaller than one (S) comparator 36 are connected to a second input of character decoder 55 and the outputs of memory units 48, 51 and 54, which are coupled from the larger than one (L) comparator 37 are connected to a third input of the character decoder 55. The ratio value information stored in memory units 46 through 54 is expeditiously shifted out of the shift register into the character decoder 45 subsequent to occurrence of the third storbe signal of sixth transitional occurrence, allowing each of the memory units 46 through 54 to be reset for processing of the next character to be read. The character decoder 55 will provide, in a manner well known in the art, a binary coded decimal digital output which upon occurrence of a decoder impulse from control logic 18, will be transferred on leads 56 to a storage register 57.

Figure 7:
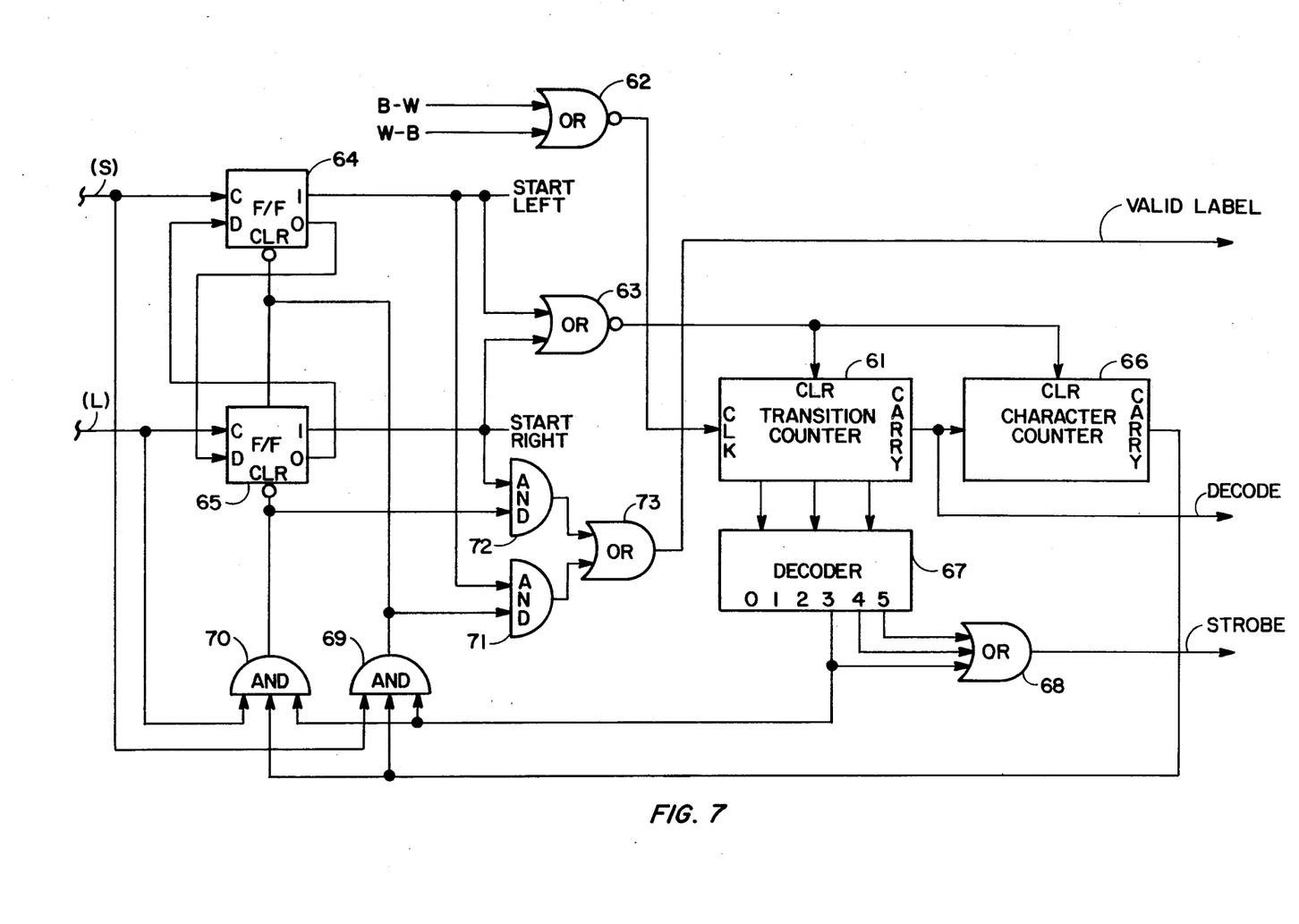
FIG. 7 is a diagram, in block form, of the circuitry used for the control logic 18 shown in FIGS. 3 and 6.

Control logic 18 controls the system operations to: specify a left-to-right and right-to-left scan; decoder; strobe, and denote end of scan. This is expeditiously accomplished by use of a control logic circuit such as is illustrated in FIG. 7, where a suitable transition counter 61 is connected from OR gate 62 with B-W and W-B pulses and also from NOR gate 63 with a stop/start signal denoting the beginning/ending of the reading of a selected group of characters on a label 12 by way of flip-flop 64 and 65 which are respectively connected to leads within comparators 36 and 37 such as that denoted at 40 in FIG. 5. In the present invention, a left-to-right scan across the dual two bar start/stop code shown in FIG. 1 would signal the commencement and then ending of reading a character in a forward direction by virtue of a two-thirds ratio signal received at flip-flop 64. As may be apparent, a right-to-left scan would signal the commencement and ending of reading a character backward by virtue of a three-halves ratio signal received at flip-flop 65. As is noted, the zero outout of each of the flip-flops is connected back to the D input of the other so that when one is enabled, the other is inhibited.

When neither of flip-flops 64, 65 are enabled, their one outputs through NOR gate 63 will maintain transition counter 61 as well as a character counter 66 in a cleared condition. As soon as either a start left signal (two-thirds) enables flip-flop 64 or a start right signal (three-halves) enables flip-flop 65, transition counter is clocked to count B-W and W-B pulses by way of OR gate 62. In addition, the direction of the scan is communicated to the character decoder 55 so that reciprocal of the ratio $R_{34}$, $R_{23}$ and $R_{12}$ can be obtained for decoding using known techniques.

Each time transition counter 61 reaches a count of five to indicate six transitions has occurred, a carry pulse enables the character counter 66 to denote the completion of scanning a complete character. The latter carry pulse is also used for effecting acceptance of the decoded character from the character decoder 55 by the storage register 57, by way of output lines 56.

Counter 61 outputs are connected to decoder 67 so that upon occurrence of the fourth, fifth and sixth transition, signals will be emitted by decoder 67 which is a typical gating circuit. The signals denoting the fourth, fifth and sixth transitions are routed through the OR gate 68 and constitute the strobe pulses. The fourth transition pulse from decoder 67 which is also connected from the output of character counter 66 is also supplied to one input of each of the AND gates 69 and 70. The input signals to flip-flops 64 and 65 denoting the S and L ratios are also respectively connected to AND gates 69 and 70. In effect, this allows either AND gate 69 or 70 to be enabled at the end of a count of a select number of characters, so that upon detection of the stop bar code upon the fourth transition count, the proper AND gate 69 or 70 is enabled to supply an enabling signal to either AND gate 71 or 72 and simultaneously clear flip-flops 64 and 65. Upon the presence of this latter enabling signal at either AND gate 71 or 72, should this match the originally enabled flip-flop 64 or 65, the start and stop bar code will be matched to enable one of the AND gates to indicate by way of OR gate 73 the end of valid character label has been read.

Operation

Operation of the invention may be best explained with reference to the waveform diagrams illustrated in FIG. 8. Assuming that the scanner 11 is crossing a tribar code representing the character one, an inverted electrical signal output representing a white to black signal from the scanner 11 is shown at waveform (a) in FIG. 8. From the differentiator 22 are derived, as is depicted at waveform (b) in FIG. 8, positive differential spikes during the black to white transitions which are operated on in threshold comparator devices 23 and 24 to generate W-B pulses and B-W pulses shown at waveforms (c) and (d) in FIG. 8 respectively.

Figure 8:
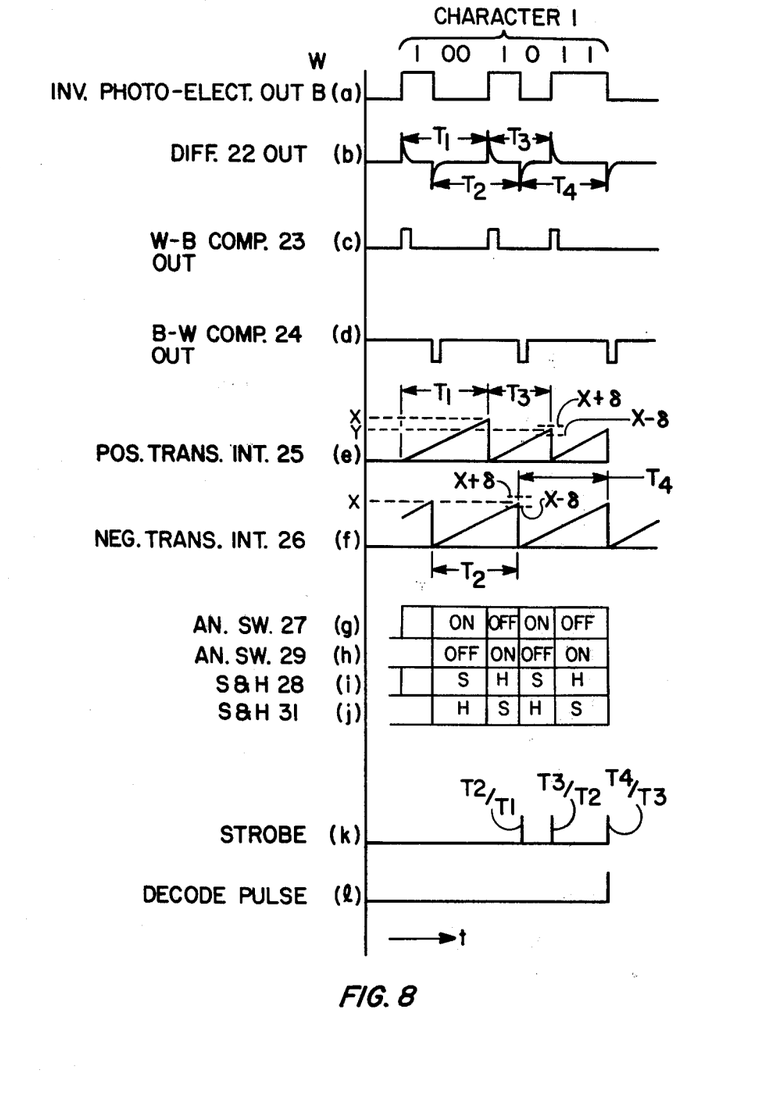
FIG. 8 is a timing chart illustrating the waveforms of selected signals generated throughout the character analyzing system and also illustrating selected states of the analog switch units and sample and hold units depicted in FIG. 4.

As may be seen at waveforms (e) and (f) of FIG. 8, positive transition integrator 25 and negative transition integrator 26 will cause ramp pulses to be generated and which are respectively reset by the W-B and B-W pulses fed to the reset inputs of the integrators 25 and 26. The W-B pulse triggers sample and hold unit 28 to cause storage of the peak of the ramp voltage generated during the period $T_1$. At the same time, analog switch 29 is then put in an on condition during the latter position of period $T_2$ (subsequent to $T_1$) to directly pass the ramp generated signal from integrator 26 to amplifiers 32, 33 and 34. Assuming that the peak level reached by the ramp signal during the transition period $T_2$ is "X" as illustrated at waveform (f) in FIG. 8, a difference amplifier 33 will generate a signal level X minus delta and summing amplifier 34 will generate a signal level X plus delta and respectively supply these signals to the inputs LL and UL of comparators 35, 36 and 37 to define "windows" having tolerance levels of X ± delta. At the same time, the stored peak ramp signal from period $T_1$ in sample and hold unit 28 is fed to the inputs of amplifiers 38, 39 and 41, which act to vary the magnitudes of their respective outputs according to pre-selected gain values at the respective ratios to the input of comparators 35, 36 and 37.

Since the periods $T_1$ and $T_2$ are of equal durations in this instance, the ramp signals generated by the integrators 25 and 26 will be approximately the same. By providing the plus and minus delta tolerance levels in each of the comparators 35, 36 and 37 to account for insignificant variances, it will be seen that indication of nearly one (N) will be arrived at in comparator 35 to generate an inside signal, whereby the signal levels emitted from amplifiers 39 and 41 will lie outside the X ± delta window causing only and $\overline{\text{INSIDE}}$ output.

These outputs from comparator 35, 36 and 37 are then transferred to memory units 46, 47 and 48 of shift register 45, upon occurrence of the leading edge of the first strobe pulse (or fourth transition pulse per character) as shown at waveform (b) in FIG. 8. The strobe signal is applied to comparators 35, 36 and 37 to allow each of the comparators to make its decision at the moment when the peak value of the signal defining the window at inputs LL and UL has been reached. Clearly, during each strobe operation, only one of the comparators will generate an INSIDE output. Upon occurrence of the trailing edge of the strobe pulse, switch 29 is turned off and switch 27 is turned on. At the same time, sample and hold unit 28 will now be in a sample state and sample and hold unit 31 is put in a hold condition to maintain a peak value representative of period $T_2$. At the peak-ramp signal level Y arrived at during period $T_3$, difference amplifier 33 will produce a Y minus delta level signal and summing amplifier 34 will produce a Y pulse delta level signal. The Y ± delta window set in each of comparators 35, 36 and 37 is compared with the immediately previous stored signal in sample and hold unit 31 having the peak voltage level X arrived at during the period $T_2$. It is readily evident that the signal X in the hold unit 31 from period $T_2$ is roughly fifty percent greater in magnitude than the peak signal Y of period $T_3$. The two-thirds gain factor amplifier 39 will modify the signal level X from the hold unit 31 to produce at comparator 36 a signal which lies between the level Y ± delta at the LL and UL window. Comparator 36 will then, upon being sampled by the strobe signal, provide an output indicating a ratio of two-thirds or less than one, as a decision for $R_{32}$. Immediately prior to dumping this information into the shift register 45 at the trailing edge of the strobe signal, the information in memory units 40 through 48 is transferred to memory units 49 through 51 at the leading edge of the strobe signal.

In a similar manner, at the end of period $T_4$ the output of integrator 26 will be a level X which is passed via analog switch 29 to apply to the UL and LL inputs of comparators 35, 36 and 37 a signal X ± delta. This signal is compared with the immediately previous stored peak signal level Y from the period $T_3$ in sample and hold unit 28. Signal level Y has a magnitude of approximately fifty percent less than the level X. Thus, amplifier 41 has such a gain factor (three-halves) to provide an output between LL and UL units to cause comparator 37 to emit an INSIDE signal during strobe which is indicative of the determination of the ratio three-to-two or less than one (L).

These three successive decisions: nearly one (N), smaller than one (S) and larger than one (L) will be respectively stored in the memory units 52, 50 and 48 of the shift register 45. Subsequent to the occurrence of each sixth transition signal for each character transition counter 61 in FIG. 7 will emit a decode output, denoted at waveform in FIG. 8, to enable storage register 57 to receive a binary coded decimal digital output on leads 56 from the character decoder 55, which output is indicative of the character one.

It will be observed that the criteria of nearly one (N), smaller than one (S) and larger than one (L) is conveniently arrived at through the signal ratio detector circuitry by using ratio values of one, two-thirds and three-halves. The particular configuration of the tri-bar code designed for the characters zero through nine, using a prescribed module width, clearly lends itself to the use of such ratio values. Specifically, it is significant to note that no code pattern contains two modules or positions of a first binary level which are followed by two positions of a second binary level.

It is again emphasized that the particular choice of modular widths and relations, as well as the specific ratios adopted, allow clear-cut determinations to be made and simplifies the decision process by having a small number of values for each ratio and by providing for sufficient latitude in period variances in the comparing stages.

What is claimed is:

1. The method of reading on a record medium a two level code representing at least one character of a set of characters, each of said characters being depicted as a group of substantially parallel bars with spaces therebetween, collectively positioned on a surface adapted to be informationally scanned along said surface in a generally linear direction generally perpendicular to all of said bars, wherein no one character has more than seven modules of information represented by said code and each character is arranged in a configuration so that two consecutive modules of a first level are not immediately followed by two consecutive modules of a second level, the code for each character defined by at least six consecutive transitional occurrences between the two levels of the code, said method comprising the steps of:

scanning the record medium to derive a time based electrical signal denoting said transitional occurrences;

measuring from said electrical signal at least the first four periods between alternate ones of said transitional occurrences;

comparing the measurements of each two overlapping periods to generate three ratios, each ratio representing not more than one of three possible values, said values being approximately one, two-thirds and three-halves, and;

decoding the values arrived at for said three ratios to define a character.

2. The method according to claim 1, wherein said comparing step to generate the three ratios allows for a velocity independent scanning capability.

* * * * *